(12) United States Patent
Graffius

(10) Patent No.: US 7,385,809 B2
(45) Date of Patent: Jun. 10, 2008

(54) PUSH RELEASE LATCH FOR A FLIP-DOWN DISPLAY DEVICE

(75) Inventor: Earl Brian Graffius, Peachtree City, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 45 days.

(21) Appl. No.: 11/418,980

(22) Filed: May 5, 2006

(65) Prior Publication Data

US 2007/0258197 A1 Nov. 8, 2007

(51) Int. Cl.
*H05K 7/12* (2006.01)

(52) U.S. Cl. .......................... 361/683; 361/732; 292/57

(58) Field of Classification Search ................ 348/837; 361/683, 732; 292/57
See application file for complete search history.

(56) References Cited

U.S. PATENT DOCUMENTS

| | | | |
|---|---|---|---|
| 5,465,191 A * | 11/1995 | Nomura et al. ............. 361/681 |
| 6,364,390 B1 * | 4/2002 | Finneman ................... 296/37.7 |
| 7,274,556 B2 * | 9/2007 | Chung ......................... 361/681 |
| 2004/0184228 A1 * | 9/2004 | Minaguchi et al. ......... 361/683 |
| 2005/0135070 A1 * | 6/2005 | Hsu et al. ................... 361/732 |

* cited by examiner

*Primary Examiner*—Jayprakash N Gandhi
*Assistant Examiner*—Ingrid Wright
(74) *Attorney, Agent, or Firm*—Laurence S. Roach, Esq.

(57) ABSTRACT

A push release latch for a display device is provided according to an embodiment of the invention. The push release latch includes a slider portion adapted to slide substantially laterally within a latch receptacle of a housing with respect to an actuation axis A of the push release latch. The slider portion includes a latch projection adapted to engage and retain a display screen and at least one actuator projection that extends from the slider portion. The latch further includes a push portion adapted to travel within the latch receptacle substantially along the actuation axis A. The push portion includes at least one sloped actuation surface that engages the at least one actuator projection of the slider portion. The at least one sloped actuation surface forces the at least one latch projection and the slider portion to move substantially laterally in response to a depression force.

31 Claims, 5 Drawing Sheets

PUSH RELEASE LATCH FOR A FLIP-DOWN DISPLAY DEVICE

BACKGROUND OF THE INVENTION

1. Field of the Invention

The present invention relates generally to a latch, and more particularly, to a push release latch for a flip-down type display panel or device.

2. Statement of the Problem

Vehicles are increasingly being manufactured with a variety of onboard electronic gear. The onboard electronic gear can be utilitarian in nature, including navigation and/or communication devices. The electronic gear can also be for entertainment purposes, including video players, music players, etc. Various types of automotive and/or portable electronic gear include removable components or components that swing, pivot or otherwise extend from the gear, such as, for example, into a passenger compartment. Device manufacturers are adding electronic devices that include display screens. Due to the limited space in an automotive passenger compartment and/or in environments in which portable gear is used, and in order to protect the electronic gear when not in use, such electronic gear is typically designed to be stowed when not in use.

In the prior art, a display screen is typically fastened in a stowed position using some manner of twist or slide latch. The prior art twist or slide latch extends a tongue or tab that engages the display screen and holds it in the stowed position. The prior art twist or slide latch must be operated in order to engage the stowed portion and must be operated in order to release the stowed portion.

The prior art approach has several drawbacks. A prior art twist or slide latch may extend into the passenger compartment, posing a risk of contact with an occupant. A prior art twist or slide latch may require excessive force and may be hard for children or the elderly to operate. A prior art twist or slide latch may require a comparatively large force to operate in comparison to the size and/or weight of the component being latched. A prior art twist or slide latch may be difficult to locate in a dim vehicle or airplane interior.

SUMMARY OF THE INVENTION

A push release latch for a display device is provided according to an embodiment of the invention. The push release latch comprises a slider portion adapted to slide substantially laterally within a latch receptacle of a housing with respect to an actuation axis A of the push release latch. The slider portion includes a latch projection adapted to engage and retain a display screen and includes at least one actuator projection that extends from the slider portion. The push release latch further comprises a push portion adapted to travel within the latch receptacle substantially along the actuation axis A. The push portion includes at least one sloped actuation surface that engages the at least one actuator projection of the slider portion. The at least one sloped actuation surface forces the at least one latch projection and the slider portion to move substantially laterally with respect to the actuation axis A in response to a depression force on the push portion.

A display device is provided according to an embodiment of the invention. The display device comprises a housing including a latch receptacle and a display screen receptacle, a display screen including a latch aperture and configured to fit at least partially into the display screen receptacle, and a push release latch formed in the latch receptacle. The push release latch comprises a slider portion adapted to slide substantially laterally within a latch receptacle of a housing with respect to an actuation axis A of the push release latch. The slider portion includes a latch projection adapted to engage and retain the display screen and includes at least one actuator projection that extends from the slider portion. The push release latch further comprises a push portion adapted to travel within the latch receptacle substantially along the actuation axis A. The push portion includes at least one sloped actuation surface that engages the at least one actuator projection of the slider portion. The at least one sloped actuation surface forces the at least one actuator projection and the slider portion to move substantially laterally with respect to the actuation axis A in response to a depression force on the push portion.

A push release latch assembly method is provided according to an embodiment of the invention. The method comprises positioning at least one first biasing device with respect to a slider portion and inserting the slider portion into a latch receptacle of a housing that includes a display screen receptacle. The method further comprises sliding the slider portion onto one or more rails of the latch receptacle until one or more retainer arms of the slider portion engage one or more corresponding arm apertures of the latch receptacle. The slider portion includes a latch projection adapted to engage and retain a display screen. The at least one first biasing device biases the latch projection toward a normally extended default position. The method further comprises inserting one or more retainer arms of a push portion into one or more corresponding arm channels and trapping at least one second biasing device between the push portion and the latch receptacle.

DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
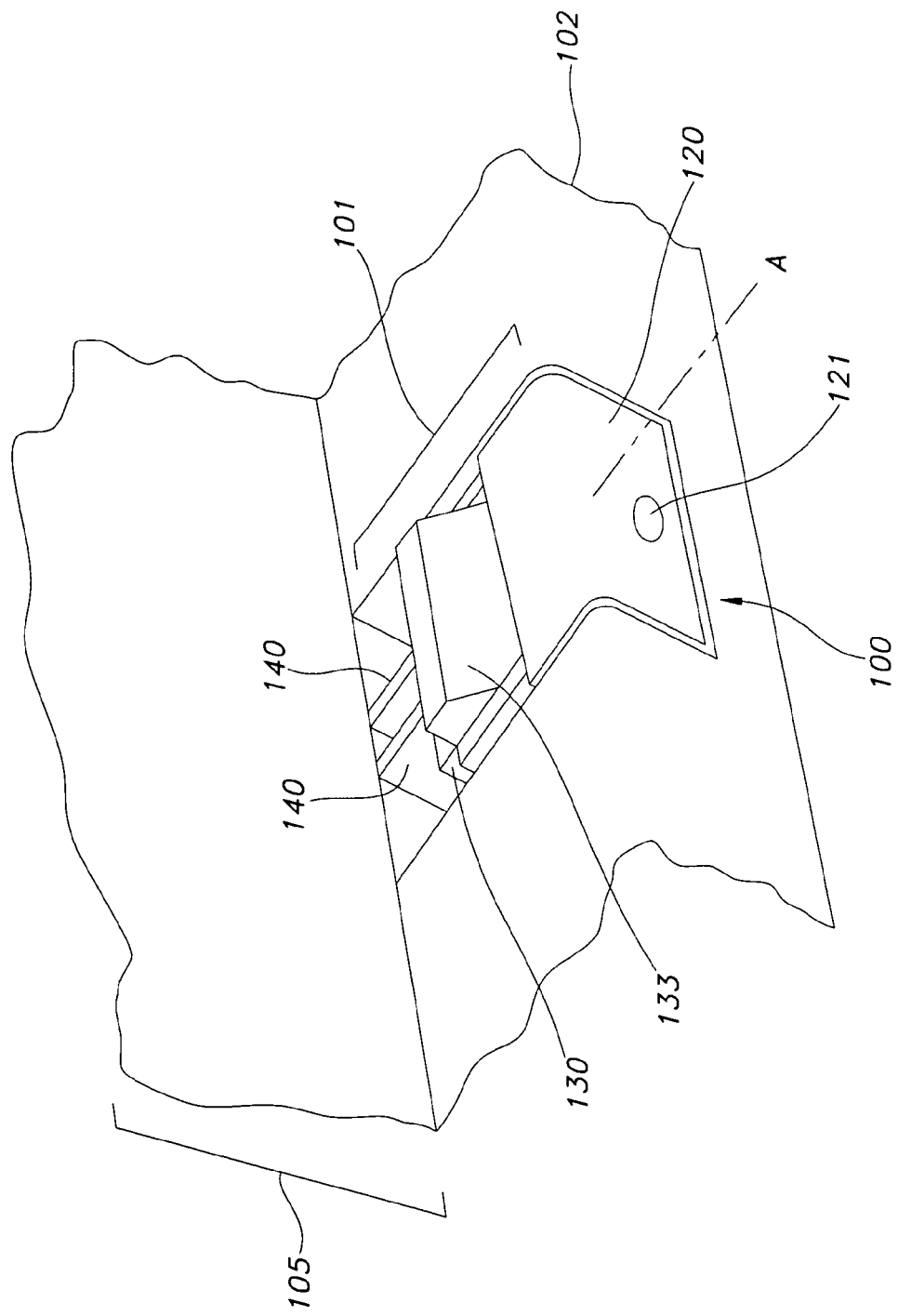
FIG. 1 shows a push release latch for a display device according to an embodiment of the invention.

FIG. 1 shows a push release latch 100 for a display device according to an embodiment of the present invention. The push release latch 100 in the figure is installed within a well or latch receptacle 101 that is defined by housing 102. The housing 102 includes a display screen receptacle 105 that receives a display screen 104 (see FIG. 4). The display screen 104 fits at least partially into the display screen receptacle 105. The push release latch 100 latches the display screen 104 into the display screen receptacle 105 and therefore to the housing 102.

The housing 102 comprises a frame or other mounting portion. The housing 102 can comprise an electronic device or portion thereof that includes or utilizes a flip-down display screen. For example, the housing 102 can comprise a portion of an automotive flip-down display device or panel and/or circuitry for processing signals for display on such a device. In some embodiments, the electronic device comprises a video device/video player. However, other display devices are contemplated and are within the scope of the description and claims.

The push release latch 100 includes both a push portion 120 and a slider portion 130 disposed in the latch receptacle 101. The slider portion 130 includes a latch projection 133 that extends from the push release latch 100 (and from the latch receptacle 101) when the push release latch 100 is in a normally extended (i.e., non-actuated) default position, as depicted in FIG. 1. In the normally extended default position, the latch projection 133 extends from the housing 102 and engages the display screen 104. In the normally extended default position, the push portion 120 is substantially flush with the housing 102. This is the position of the push release latch 100 in the absence of an actuation force on the latch.

The push release latch 100 includes an actuation axis A. When the push portion 120 is depressed substantially along the actuation axis A to an actuated position, the slider portion 130 is moved substantially laterally with respect to the actuation axis A by the push portion 120. As a result, the latch projection 133 is substantially retracted into the push release latch 100 (and/or into the latch receptacle 101). Consequently, the latch projection 133 disengages from and releases the display screen 104.

The travel of the push portion 120 is limited by a stop or stops. Alternatively, in another embodiment the push portion 120 bottoms out in the latch receptacle 101.

The latch projection 133 is biased toward the normally extended default position by a first biasing force exerted upon the slider portion 130. The first biasing force is generated by one or more first biasing devices 139 (see FIG. 3 and the accompanying discussion below). Consequently, after the push release latch 100 has been actuated by being depressed and then released, the latch projection 133 is biased toward and returns to the position shown in the figure.

The push portion 120 is biased toward the normally extended default position, wherein it is substantially flush with housing 102, by a second biasing force exerted upon the push portion 120. The second biasing force is generated by one or more second biasing devices 128 (see FIG. 3). Consequently, after the push release latch 100 has been actuated by being depressed and then released, the push portion 120 is biased toward and returns to the normally extended default position.

The push release latch 100 is operated in order to release the display screen 104 when the display screen 104 is latched to the housing 102. However, the push release latch 100 does not need to be manually engaged or operated by a user in order to latch the display screen 104. Instead, when the display screen 104 is moved into the display screen receptacle 105, the display screen 104 temporarily depresses the latch projection 133. The latch projection 133 is thus depressed until the display screen 104 is in position in the display screen receptacle 105, whereupon the latch projection 133 is released and springs back to the fully extended default position.

The push portion 120 in some embodiments includes an index feature 121, such as, for example, a projection or depression. The index feature 121 is generally contacted by the finger or fingers of a user in order to depress the push portion 120, actuate the push release latch 100, and release the display screen 104. Therefore, the index feature 121 assists a person in finding the push portion 120 and in keeping a finger or fingers on the push portion 120 during actuation of the push release latch 100.

Advantageously, in the push release latch 100, all of the construction and assembly features are disposed substantially entirely within the latch receptacle 101 and therefore are concealed from a user. For example, molding marks, seams, etc., on the push portion 120 and on the slider portion 130 are formed on a back surface and thus hidden from sight. Any contact markings, scuffing, etc., are similarly hidden. Further, all apertures and other structural members used for assembly of the push release latch 100 are also hidden from view (see FIG. 2).

Figure 2:
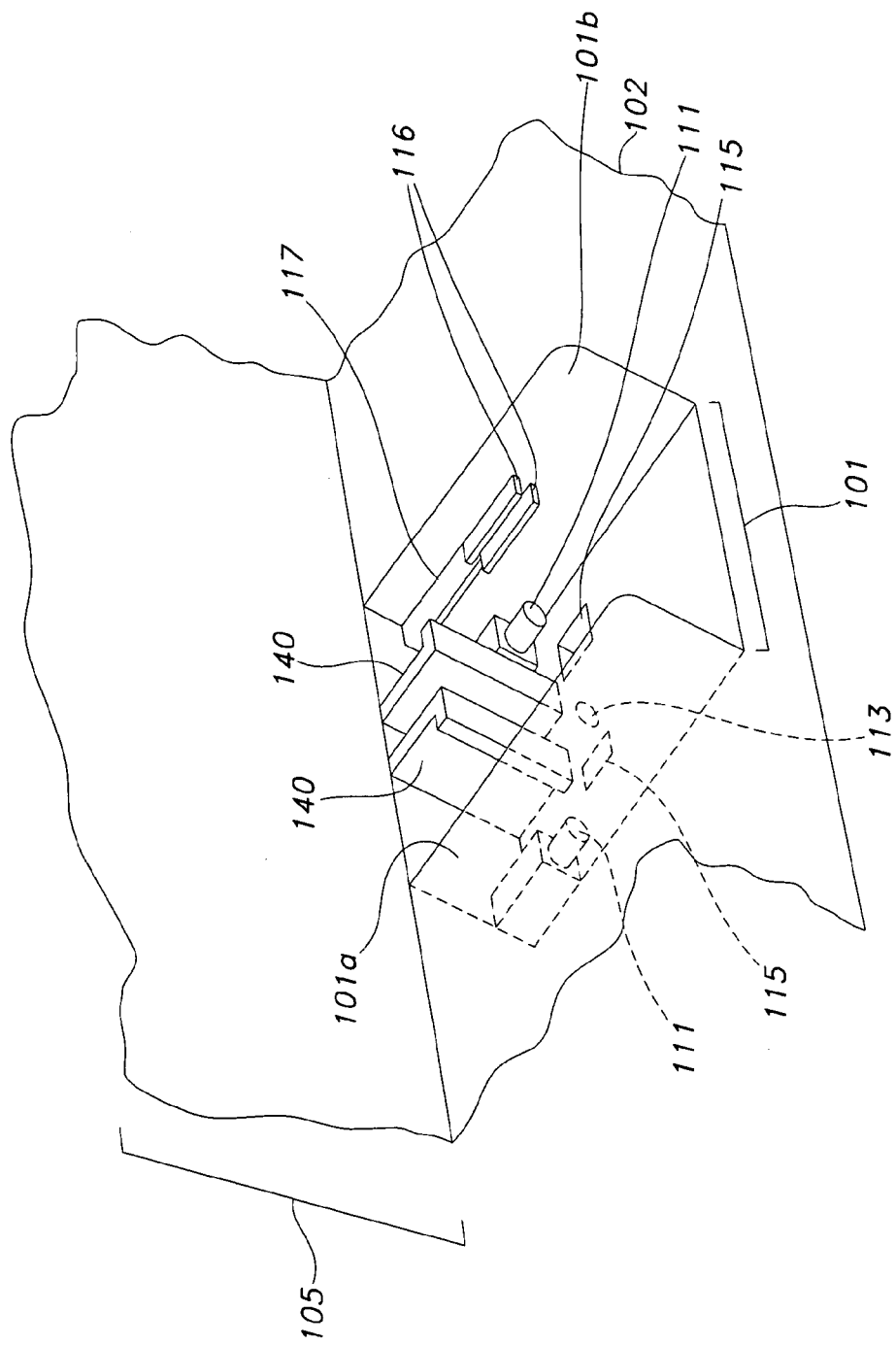
FIG. 2 shows detail of a latch receptacle according to an embodiment of the invention.

FIG. 2 shows detail of the latch receptacle 101 according to an embodiment of the invention. The latch receptacle 101 includes one or more rails 140, one or more latch receptacle posts 111, a retainer post aperture 113, two arm apertures 115, two pairs of arm guides 116 on the sides 101a and 101b of the latch receptacle 101, and an arm channel 117 on the sides 101a and 101b.

The one or more latch receptacle posts 111 correspond to one or more second biasing devices 128 that place the second biasing force on the push portion 120. The one or more latch receptacle posts 111 hold and retain the ends of the one or more second biasing devices 128, where in some embodiments the second biasing devices 128 comprise coil or helical springs (see FIG. 3).

The retainer post aperture 113 receives an end of a slider portion post 138 (FIG. 3) that extends from the slider portion 130. The slider portion post 138 retains the first biasing device 139 in position on the slider portion 130 and in position against the corresponding surface of the latch receptacle 101. In addition, the slider portion post 138 guides and stabilizes the slider portion 130 as the slider portion 130 moves substantially laterally to the actuation axis A.

The two arm apertures 115 receive retainer arms 136 (see FIG. 3) that extend from the slider portion 130. The two retainer arms 136 extend through the two arm apertures 115, wherein an arm projection 137 of a retainer arm 136 engages an edge of an arm aperture 115 and retains the slider portion 130 in the latch receptacle 101. In addition, the two retainer arms 136 guide and stabilize the slider portion 130 as the slider portion 130 moves laterally in the latch receptacle 101.

A pair of arm guides 116 are located on the sides 101a and 101b of the latch receptacle 101. The retainer arms 123 of the push portion 120 travel through a channel defined by a pair of arm guides 116 when the slider portion 130 is assembled to the latch receptacle 101.

The two arm channels 117 are located on both sides 101a and 101b of the latch receptacle 101. The two arm channels 117 are disposed or formed in the side surfaces 101a and 101b of the latch receptacle 101 and the arm channels 117 slidably receive the retainer arms 123 of the slider portion 130 when the slider portion 130 is fully assembled to the latch receptacle 101.

Figure 3:
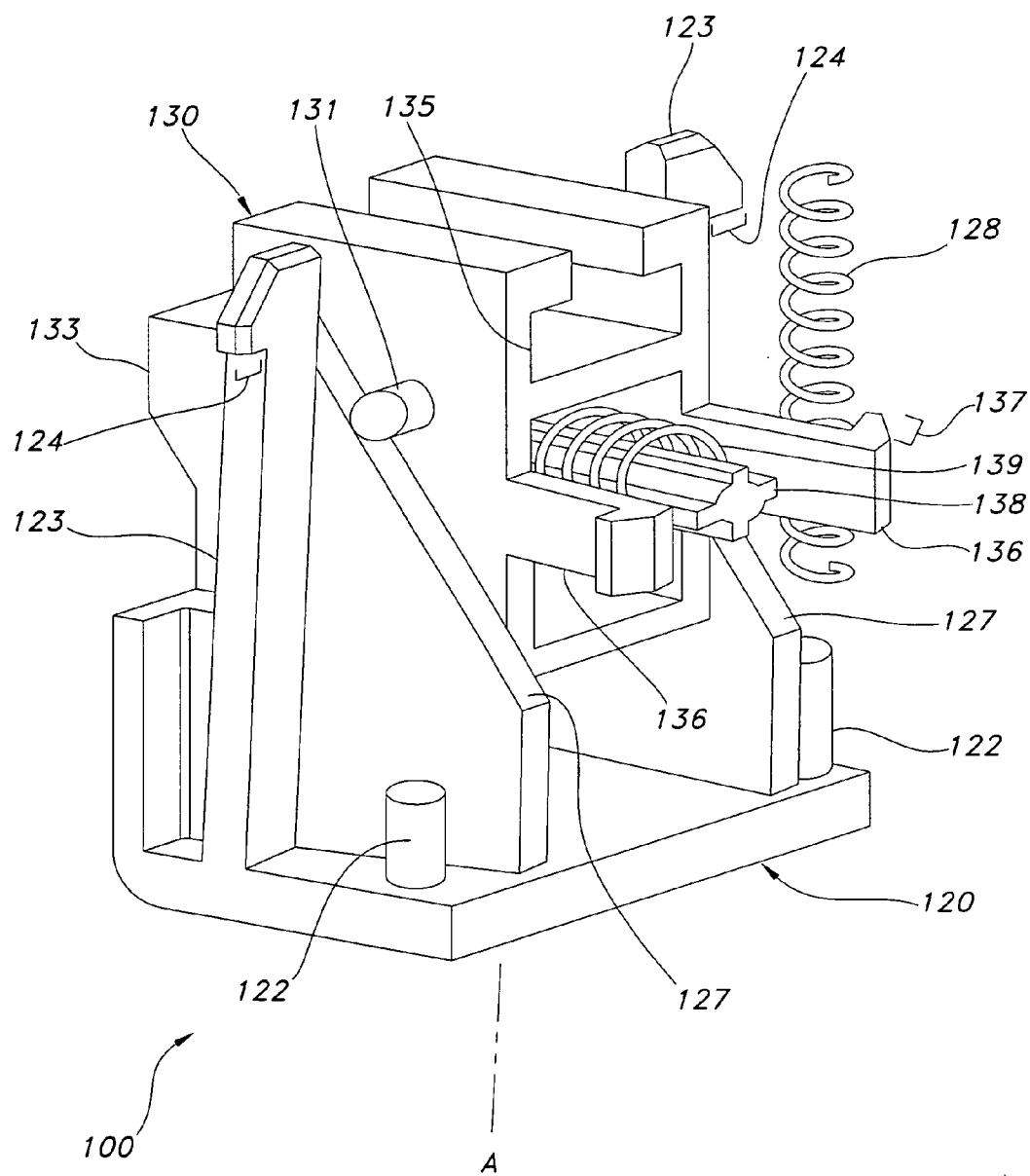
FIG. 3 shows detail of the push release latch according to an embodiment of the invention.

FIG. 3 shows detail of the push release latch 100 according to an embodiment of the invention. The push release latch 100 includes the push portion 120 and the slider portion 130, as previously discussed.

The push portion 120 includes one or more sloped actuation surfaces 127, a pair of retainer arms 123 that include arm projections 124, one or more push portion posts 122, and one or more second biasing devices 128.

The one or more sloped actuation surfaces 127 contact corresponding actuator projections 131 of the slider portion 130 and force the slider portion 130 to move laterally in response to the perpendicular motion of the push portion 120. The one or more sloped actuation surfaces 127 can have any desirable slope. The slope of the one or more sloped actuation surfaces 127 determines the actuation speed and the actuation distance. Thus, the actuation speed and the actuation transit distance of the latch projection 133 are adjusted and customized as desired by corresponding adjustment/customization of the actuation surfaces 127.

In one embodiment, the one or more sloped actuation surfaces 127 comprise substantially planar surfaces. Alternatively, in another embodiment the one or more sloped actuation surfaces 127 comprise substantially curved surfaces.

The pair of retainer arms 123 engage the housing 102 and retain the push portion 120 to the housing 102. The retainer arms 123 include arm projections 124 that extend from the retainer arms 123. The retainer arms 123 are received in the arm channels 117. The retainer arms 123 are elastically deformable or resilient, wherein the retainer arms 123 are elastically deformed during the assembly process and spring back, wherein the arm projections 124 engage edges of the arm channels 117. The retainer arms 123 therefore slidably retain the push portion 120 to the housing 102.

The push portion 120, in some embodiments, further includes one or more push portion posts 122 and the one or more second biasing devices 128 correspond to and fit over the one or more push portion posts 122. Only one second biasing device 128 is shown for clarity. The one or more push portion posts 122 therefore retain ends of the one or more second biasing devices 128. The second biasing force urges the push portion 120 to a non-actuated, normally extended default position, substantially flush with the surface of the housing 102 (see FIG. 1).

It should be noted that the first biasing device 139 acting alone on the slider portion 130 can return the push portion 120 to the non-actuated position. The push portion 120 does not have to include a separate second biasing device or devices 128 in order to return to the non-actuated position.

The slider portion 130 includes one or more actuator projections 131, the latch projection 133, a rail slot 135, retainer arms 136 including arm projections 137, a slider portion post 138, and a first biasing device 139.

The one or more actuator projections 131 extend from the slider portion 130 and slidably engage the corresponding one or more sloped actuation surfaces 127 of the push portion 120. Therefore, when the push portion 120 is actuated substantially along the actuation axis A, the slider portion 130 is force to move substantially laterally with respect to the actuation axis A. The push portion 120 and the slider portion 130 can be lubricated or non-lubricated.

The one or more actuator projections 131 are shown as being substantially cylindrical. However, it should be noted that the one or more actuator projections 131 can be of other shapes/sizes, and other shapes/sizes are within the scope of the description and claims.

The rail slot 135 engages one or more corresponding rails 140 of the housing 102 and therefore is able to slide laterally on the one or more corresponding rails 140.

The retainer arms 136 pass through the corresponding arm apertures 115 in the housing 102. The retainer arms 136 are elastically deformed during this insertion and resiliently return to a normal position when fully inserted, wherein the arm projections 137 engage an edge of the arm apertures 115. The arm projections 137 form travel stops for the slider portion 130 at the fully extended position of the latch projection 133. The arm projections 137 do not keep the slider portion 130 from moving laterally with respect to the push portion 120.

The first biasing device 139 exerts a first biasing force on the slider portion 130 that urges the slider portion 130 to the normally extended default position of the latch projection 133. The first biasing device 139 is fitted at least partially over the slider portion post 138, wherein the slider portion post 138 receives and retains an end of the first biasing device 139. The first biasing device 139 also contacts a surface of the housing 102 in the latch receptacle 101.

The one or more first biasing devices 139 and the one or more second biasing devices 128 can comprise coil/helical springs, as shown. Alternatively, the one or more first biasing devices 139 and the one or more second biasing devices 128 can comprise any other type of biasing device, including flat or leaf springs, diaphragms, etc.

Figure 4:
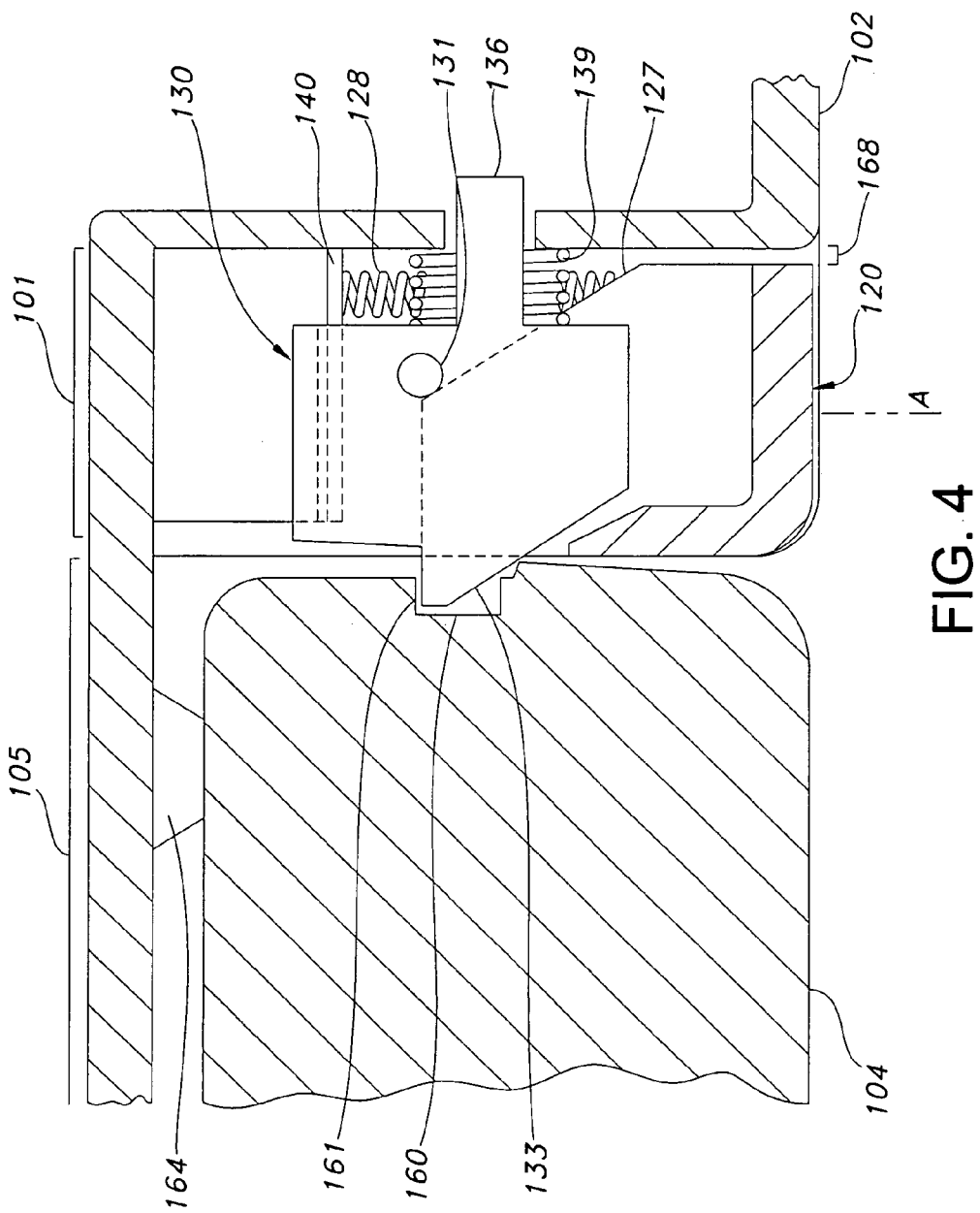
FIG. 4 is a cross-sectional view through a housing, a display screen, and the push release latch according to an embodiment of the invention.

FIG. 4 is a cross-sectional view through the housing 102, the display screen 104, and the push release latch 100 according to an embodiment of the invention. The display screen 104 in this figure is in place and latched in the display screen receptacle 105 by the latch projection 133 of the push release latch 100. The push portion 120 therefore is in a normally extended default position, substantially flush with the surface of the housing 102. In addition, the latch projection 133 is also in a normally extended default position and engages a latch aperture 160 in the display screen 104.

The latch aperture 160 includes a latch aperture face 161 that is contacted by the latch projection 133. Alternatively, the latch projection 133 and/or the latch aperture face 161 can be angled, wherein they do not fully contact each other. When angled, the latch projection 133 may generate a greater or lesser latch force, as desired.

It can be seen from this figure that as the display screen 104 is brought into the display screen receptacle 105, the display screen 104 will contact the latch projection 133 and will force the slide portion 130 to the right in the figure, against the first biasing force provided by the first biasing device 139. The slider portion 130 will therefore move to allow the display screen 104 to fit into the display screen receptacle 105, and will then re-extend when the display screen 104 is substantially fully in position. The first biasing device 139 will subsequently push the slider portion 130 to the left in the figure, wherein the latch projection 133 engages and retains the display screen 104.

It should be understood that the first biasing device 139 is still under at least some compression when the latch projection 133 is fully extended. Consequently, the slider portion 130 will have a large extension span. This is commonly referred to as "overtravel". As a result, the push release latch 100 will operate properly even where the distance to the display screen 104 varies significantly. This guarantees that the latching action to the display screen 104 will be well seated. In addition, this large extension span will prevent vibration of the display screen 104.

The display screen receptacle 105 can include one or more bumpers 164. The one or more bumpers 164 can be formed of a compressible or resilient material. In some embodiments, the display screen 104 must at least partially compress the one or more bumpers 164 before the latch projection 133 will engage the latch aperture 160 of the display screen 104. The one or more bumpers 164 therefore place a predetermined compression force on the display screen 104. The one or more bumpers 164 consequently function to absorb and/or prevent vibration of the display screen 104.

It can be seen from this figure that depression of the push portion 120 will cause the one or more sloped actuation surfaces 127 to laterally move the one or more corresponding actuator projections 131. When the push portion 120 is released, the biasing devices will exert at least a first biasing force (and optionally and additional second biasing force) on the push release latch 100, returning the push portion 120 and the slider portion 130 to normal, non-actuated positions.

The figure further shows a vibration isolation clearance 168. The vibration isolation clearance 168 is of a predetermined size. The vibration isolation clearance 168 allows the push portion 120 to vibrate at least somewhat without contacting the housing 102.

Figure 5:
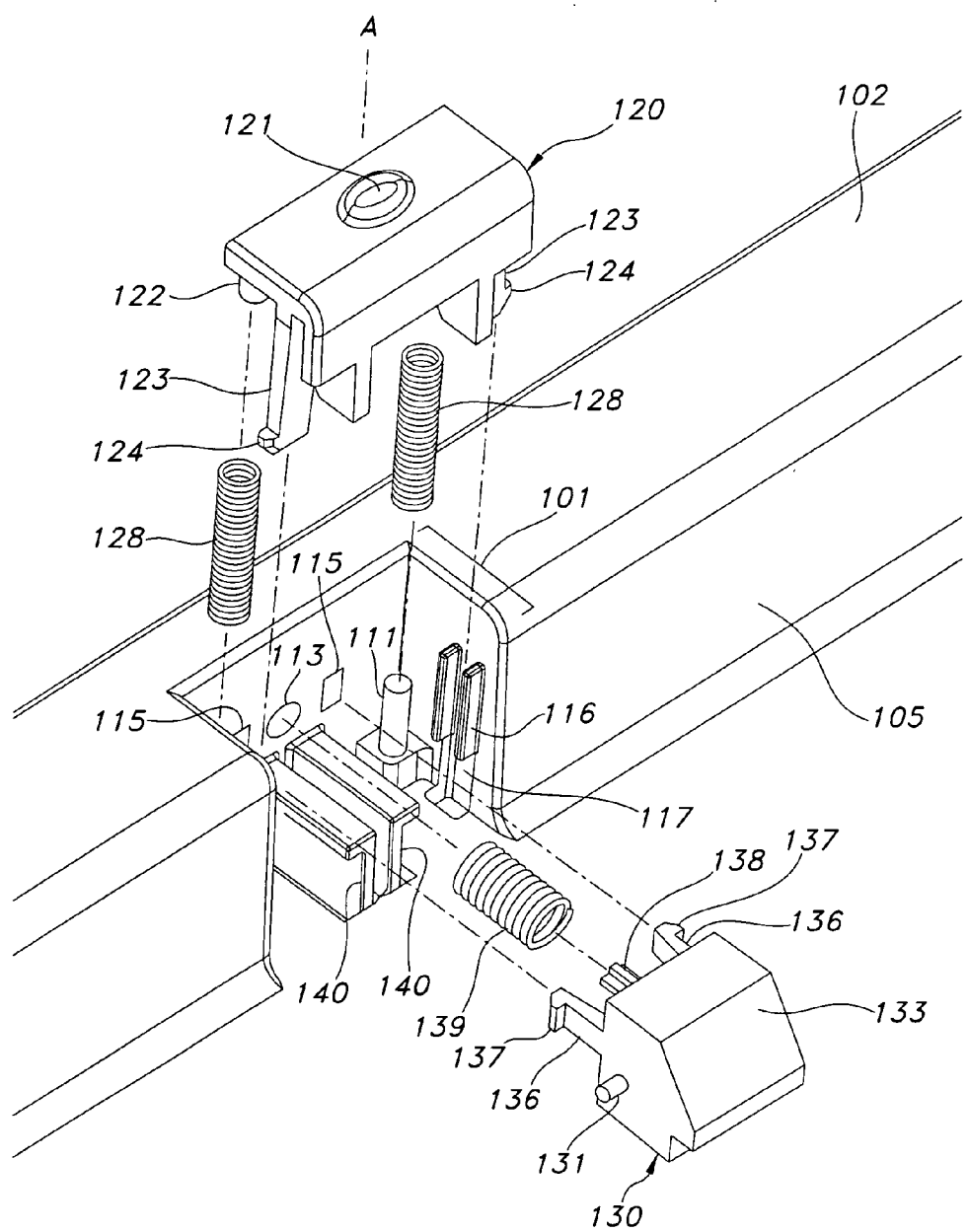
FIG. 5 is an exploded view of the components of the push release latch according to an embodiment of the invention.

FIG. 5 is an exploded view of the components of the push release latch 100 according to an embodiment of the invention. This view illustrates an assembly method according to an embodiment of the invention. To assemble the push release latch 100, the first biasing device 139 is positioned with respect to the slider portion 130. This entails positioning the first biasing device 139 on the slider portion post 138 or positioning the first biasing device 139 in the latch receptacle 101 over the retainer post aperture 113 so that the slider portion post 138 will be positioned within the first biasing device 139 when assembled.

The slider portion 130 is then inserted into the latch receptacle 101. The slider portion 130 is slid onto one or more rails 140 of the latch receptacle 101 until the retainer arms 136 of the slider portion 130 elastically deform into, partially through, and engage the arm apertures 115 of the latch receptacle 101. At this point in the assembly, the first biasing device 139 biases the latch projection 133 (and the entire slider portion 130) toward the normally extended default position.

The retainer arms 123 of the push portion 120 are inserted into the corresponding arm channels 117 of the latch receptacle 101 as the push portion 120 is then inserted into the latch receptacle 101. The retainer arms 123 first pass between the pairs of arm guides 116. The push portion 120 fits at least partially over the slider portion (see FIG. 1). The push portion 120 additionally traps at least one second biasing device 128 between the push portion 120 and the latch receptacle 101. In the embodiment shown, the push release latch 100 includes two second biasing devices 128. A second biasing device engages a latch receptacle post 111 in the latch receptacle 101 and further engages a push portion post 122 on the push portion 120. The posts 111 and 122 retain the ends of a second biasing device 128.

The push release latch 100 can therefore be assembled in a snap together manner. The assembly can be performed quickly. The assembly can be performed without the need for any tools.

In the embodiments shown, the push release latch 100 is sometimes discussed in the context of an automotive display device. However, it should be understood that the push release latch 100 can be employed on a variety of portable or vehicular display devices or other components employing a swing-out or removable member. The housing 102 can comprise any manner of device or frame. The display screen 104 can comprise any manner of display device. Some examples of other embodiments are cupholders, storage compartments, ashtrays or waste bins, etc. These alternative embodiments are within the scope of the description and claims.

The push release latch and display device according to the invention can be employed according to any of the embodiments in order to provide several advantages, if desired. The invention provides a latch having a compact size. The invention provides a quiet latch operation. The invention provides a latch that is robust and quiet in the presence of vibration. The invention provides a latch that is easy to assembly and requires no special tools. The size of the push release latch can be scaled as needed. The invention provides a latch wherein a positive latch state is not dependent on a spring. The invention provides a latch that can use only one biasing device in some embodiments. The invention provides a latch that doesn't need to be operated in order to latch the display screen. The invention provides the ability to customize the actuation speed and actuation transit distance of the latch projection.

What is claimed is:

1. A push release latch for a display device, comprising:
    a slider portion adapted to slide substantially laterally within a latch receptacle of a housing with respect to an actuation axis A of the push release latch, with the slider portion including a latch projection adapted to engage and retain a display screen and including at least one actuator projection that extends from the slider portion; and
    a push portion adapted to travel within the latch receptacle substantially along the actuation axis A, with the push portion including at least one sloped actuation surface that engages the at least one actuator projection of the slider portion, wherein the at least one sloped actuation surface forces the at least one latch projection and the slider portion to move substantially laterally with respect to the actuation axis A in response to a depression force on the push portion.

2. The push release latch of claim 1, further comprising one or more first biasing devices that place a first biasing force on the slider portion, with the first biasing force biasing the latch projection toward a normally extended default position.

3. The push release latch of claim 1, further comprising one or more second biasing devices that place a second biasing force on the push portion, with the second biasing force biasing the push portion toward a substantially non-actuated default position.

4. The push release latch of claim 1, further comprising:
    a first biasing device that places a first biasing force on the slider portion, with the first biasing force biasing the latch projection toward a normally extended default position; and two second biasing devices that place a second biasing force on the push portion, with the second biasing force biasing the push portion toward a substantially non-actuated default position.

5. The push release latch of claim 1, with the push release latch latching a display screen to the housing, with the housing including a display screen receptacle.

6. The push release latch of claim 5, with the display screen receptacle including one or more bumpers, with the one or more bumpers placing a predetermined compression force on the display screen when the display screen is latched into the display screen receptacle by the push release latch.

7. The push release latch of claim 1, with the push release latch latching a display screen to the housing, with the housing comprising an automotive display screen device.

8. The push release latch of claim 1, with the slider portion further comprising one or more retainer arms, with a retainer arm of the one or more retainer arms including an arm projection that limits lateral movement of the slider portion to a predetermined span.

9. The push release latch of claim 1, with the push portion further comprising one or more retainer arms, with a retainer arm of the one or more retainer arms including an arm projection and with the retainer arm adapted to slide in an arm channel in the latch receptacle.

10. The push release latch of claim 1, further comprising an index feature formed on the push portion.

11. The push release latch of claim 1, with the slider portion further comprising a rail slot adapted for receiving one or more rails of the latch receptacle.

12. A display device, comprising:
a housing defining a latch receptacle and a display screen receptacle;
a display screen including a latch aperture and configured to fit at least partially into the display screen receptacle; and
a push release latch disposed substantially entirely within the latch receptacle, with the push release latch comprising:
a slider portion adapted to slide substantially laterally within a latch receptacle of a housing with respect to an actuation axis A of the push release latch, with the slider portion including a latch projection adapted to engage and retain the display screen and including at least one actuator projection that extends from the slider portion; and
a push portion adapted to travel within the latch receptacle substantially along the actuation axis A, with the push portion including at least one sloped actuation surface that engages the at least one actuator projection of the slider portion, wherein the at least one sloped actuation surface forces the at least one actuator projection and the slider portion to move substantially laterally with respect to the actuation axis A in response to a depression force on the push portion.

13. The display device of claim 12, further comprising one or more first biasing devices that place a first biasing force on the slider portion, with the first biasing force biasing the latch projection toward a normally extended default position.

14. The display device of claim 12, further comprising one or more second biasing devices that place a second biasing force on the push portion, with the second biasing force biasing the push portion toward a substantially non-actuated default position.

15. The display device of claim 12, further comprising:
a first biasing device that places a first biasing force on the slider portion, with the first biasing force biasing the latch projection toward a normally extended default position; and
two second biasing devices that place a second biasing force on the push portion, with the second biasing force biasing the push portion toward a substantially non-actuated default position.

16. The display device of claim 12, with the display screen receptacle including one or more bumpers, with the one or more bumpers placing a predetermined compression force on the display screen when the display screen is latched into the display screen receptacle by the push release latch.

17. The display screen device of claim 12, with the slider portion further comprising one or more retainer arms, with a retainer arm of the one or more retainer arms including an arm projection that limits lateral movement of the slider portion to a predetermined span.

18. The display screen device of claim 12, with the push portion further comprising one or more retainer arms, with a retainer arm of the one or more retainer arms including an arm projection and with the retainer arm adapted to slide in an arm channel in the latch receptacle.

19. The display screen device of claim 12, further comprising an index feature formed on the push portion.

20. The display screen device of claim 12, with the slider portion further comprising a rail slot adapted for receiving one or more rails of the latch receptacle.

21. A method of assembling a push release latch, comprising:
positioning at least one first biasing device with respect to a slider portion;
inserting the slider portion into a latch receptacle, the latch receptacle defined by a housing that defines a display screen receptacle, and sliding the slider portion onto one or more rails of the latch receptacle until one or more retainer arms of the slider portion engage one or more corresponding arm apertures of the latch receptacle, with the slider portion including a latch projection adapted to engage and retain a display screen, wherein the at least one first biasing device biases the latch projection toward a normally extended default position; and
inserting one or more retainer arms of a push portion into one or more corresponding arm channels and trapping at least one second biasing device between the push portion and the latch receptacle.

22. The method of claim 21, with the slider portion including at least one actuator projection that extends from the slider projection and with the push portion including at least one sloped actuation surface, wherein the at least one sloped actuation surface forces the at least one actuator projection and the slider portion to move substantially laterally with respect to an actuation axis A of the push release latch in response to a depression force on the push portion.

23. The method of claim 21, with positioning the at least one first biasing device further comprising fitting the first biasing device at least partially over a slider portion post extending from the slider portion.

24. The method of claim 21, with trapping the at least one second biasing device comprising the at least one second biasing device engaging a latch receptacle post and also engaging a push portion post.

25. The method of claim 21, with trapping the at least one second biasing device comprising trapping two second biasing devices between the push portion and the latch receptacle.

26. The method of claim 21, with the display screen receptacle including one or more bumpers, with the one or more bumpers placing a predetermined compression force on the display screen when the display screen is latched into the display screen receptacle by the push release latch.

27. The method of claim 21, with the housing comprising an display screen device.

28. The method of claim 21, with a retainer arm of the one or more retainer arms including an arm projection that limits lateral movement of the slider portion to a predetermined span.

29. The method of claim 21, with a retainer arm of the one or more retainer arms including an arm projection and with the retainer arm adapted to slide in an arm channel in the latch receptacle.

30. The method of claim 21, further comprising an index feature formed on the push portion.

31. The method of claim 21, with the slider portion further comprising a rail slot adapted for receiving one or more rails of the latch receptacle.

* * * * *